US008512207B2

(12) United States Patent
Stoner et al.

(10) Patent No.: US 8,512,207 B2
(45) Date of Patent: Aug. 20, 2013

(54) TORQUE CONVERTER CONTROL FOR A VEHICLE

(75) Inventors: Michael Anthony Stoner, Eden Prairie, MN (US); Vincent Joseph Duray, Edina, MN (US)

(73) Assignee: Eaton Corporation, Cleveland, OH (US)

( * ) Notice: Subject to any disclaimer, the term of this patent is extended or adjusted under 35 U.S.C. 154(b) by 302 days.

(21) Appl. No.: 13/033,583

(22) Filed: Feb. 23, 2011

(65) Prior Publication Data

US 2011/0203891 A1 Aug. 25, 2011

Related U.S. Application Data

(60) Provisional application No. 61/307,118, filed on Feb. 23, 2010.

(51) Int. Cl.
*B60W 10/02* (2006.01)
*F16H 61/58* (2006.01)
*F16H 47/04* (2006.01)

(52) U.S. Cl.
USPC .............................. 477/175; 477/62; 475/83

(58) Field of Classification Search
USPC ................ 477/54, 62, 64, 86, 174, 175, 180, 477/906; 475/72, 83; 74/665 L
See application file for complete search history.

(56) References Cited

U.S. PATENT DOCUMENTS

| 5,697,466 | A | 12/1997 | Moroto et al. | |
|---|---|---|---|---|
| 7,610,143 | B1 | 10/2009 | Boesch | |
| 2010/0248893 | A1* | 9/2010 | Shimanaka | 477/5 |
| 2011/0086739 | A1* | 4/2011 | Kajigai et al. | 477/5 |

FOREIGN PATENT DOCUMENTS

| AU | 730265 B2 | 3/2001 |
|---|---|---|
| DE | 10 2004 013 581 A1 | 11/2004 |
| EP | 1 939 433 A2 | 7/2008 |

OTHER PUBLICATIONS

International Search Report and Written Opinion mailed Jun. 8, 2011.

* cited by examiner

*Primary Examiner* — Roger Pang
(74) *Attorney, Agent, or Firm* — Merchant & Gould P.C.

(57) ABSTRACT

A method for controlling a transmission assembly includes providing a vehicle having a first power source and a second power source disposed in parallel with the first power source. The first power source includes a prime mover and a transmission assembly. The transmission assembly includes a torque converter coupled to the prime mover. The transmission assembly further includes a clutch that selectively engages the torque converter to a transmission of the transmission assembly. The second power source includes a pump-motor unit, a fluid reservoir and an energy storage unit. A torque value of the second power source is compared to a torque threshold value. The clutch of the transmission assembly is disengaged so that the torque converter of the transmission assembly is disengaged from the transmission of the transmission assembly when the torque value of the second power source is greater than or equal to the torque threshold value.

9 Claims, 9 Drawing Sheets

TORQUE CONVERTER CONTROL FOR A VEHICLE

CROSS REFERENCE TO RELATED APPLICATIONS

The present disclosure claims priority to U.S. Provisional Patent Application Ser. No. 61/307,118, entitled "Control Logic for Reducing Torque Converter Windage Losses in an Automatic Transmission" and filed on Feb. 23, 2010, the disclosure of which is hereby incorporated by reference in its entirety.

BACKGROUND

On-highway and off-highway hybrid vehicles are vehicles that include multiple power sources. In one example, the hybrid vehicle may use a conventional gas powered engine to propel the vehicle in one mode of operation and an electric motor to propel the vehicle in another mode of operation. In another example, the hybrid vehicle may use a conventional gas powered engine to propel the vehicle in one mode of operation and a fluid motor to propel the vehicle in another mode of operation. As a result of the multiple power sources, hybrid vehicles provide cost efficient operation.

SUMMARY

An aspect of the present disclosure relates to a method for controlling a transmission assembly of a vehicle. The method includes providing a vehicle having a first power source. The first power source includes a prime mover and a transmission assembly. The transmission assembly includes a torque converter that is coupled to the prime mover. The transmission assembly further includes a clutch that selectively engages the torque converter to a transmission of the transmission assembly. The clutch of the transmission assembly is disengaged so that the torque converter of the transmission assembly is disengaged from the transmission of the transmission assembly when the prime mover of the vehicle is idling. The clutch is engaged when the prime mover of the vehicle is in a non-idling state.

Another aspect of the present disclosure relates to a method for controlling a transmission assembly of a vehicle. The method includes providing a vehicle having a first power source. The first power source includes a prime mover and a transmission assembly. The transmission assembly includes a torque converter having an input that is coupled to the prime mover and an output that is coupled to a transmission. The transmission assembly further includes a clutch that selectively engages the output of the torque converter to the transmission. An accelerator pedal position is compared to a position threshold value. A vehicle speed is compared to a speed threshold value. The clutch of the transmission assembly is disengaged so that the torque converter of the transmission assembly is disengaged from the transmission of the transmission assembly when the accelerator pedal position is less than or equal to the position threshold value and the vehicle speed is less than or equal to the speed threshold value.

Another aspect of the present disclosure relates to a method for controlling a transmission assembly of a vehicle. The method includes providing a vehicle having a first power source and a second power source disposed in parallel with the first power source. The first power source includes a prime mover and a transmission assembly. The transmission assembly includes a torque converter that is coupled to the prime mover. The transmission assembly further includes a clutch that selectively engages the torque converter to a transmission of the transmission assembly. The second power source includes a pump-motor unit, a fluid reservoir and an energy storage unit. A torque value of the second power source is compared to a torque threshold value. The clutch of the transmission assembly is disengaged so that the torque converter of the transmission assembly is disengaged from the transmission of the transmission assembly when the torque value of the second power source is greater than or equal to the torque threshold value.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
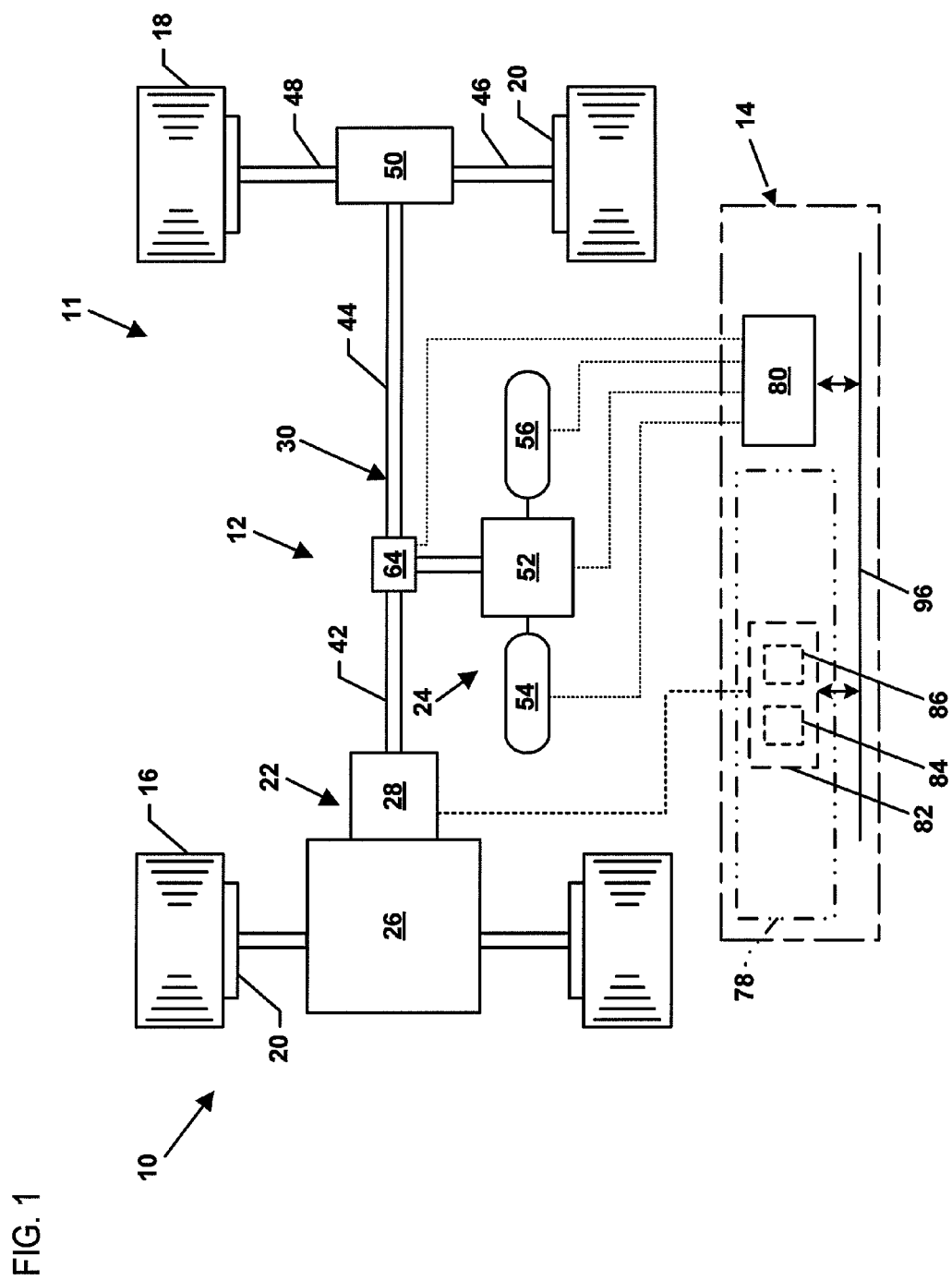
FIG. 1 is a schematic representation of a drive system of a vehicle having exemplary features of aspects in accordance with the principles of the present disclosure.

Referring now to FIG. 1, a schematic representation of a drive system 10 of a vehicle 11 is shown. In one aspect of the present disclosure, the drive system 10 is suitable for use in an on-highway vehicle, such as a truck, a refuse truck, a bus, or an automobile, or an off-highway vehicle, such as construction and agriculture vehicles.

In the depicted example of FIG. 1, the drive system 10 includes a hybrid drive assembly 12 and a control system 14. The hybrid drive assembly 12 is adapted to selectively propel the vehicle 11 while the control system 14 is adapted to control the hybrid drive assembly 12.

The drive system 10 further includes one or more front wheels 16 and one or more rear wheels 18. A brake 20 is operably associated with each of the front and rear wheels 16, 18 of the drive system 10. The brakes 20 are adapted to selectively decrease the kinetic energy of the vehicle 11. In one aspect of the present disclosure, the brakes 20 are friction brakes. Non-limiting examples of friction brakes that are suitable for use in the drive system 10 include disc brakes, drum brakes, mechanically actuated brakes, hydraulically actuated brakes, pneumatically actuated brakes, electronically actuated brakes, or combinations thereof.

The hybrid drive assembly 12 of the drive system 10 includes a first power source 22 that is adapted to propel the vehicle 11 and a second power source 24 that is adapted to propel the vehicle 11. In the depicted example of FIG. 1, the second power source 24 is disposed in parallel to the first power source 22. In other examples, however, the second power source 24 can be disposed in series to the first power source 22.

The first power source 22 of the hybrid drive assembly 12 includes a conventional prime mover 26, such as an internal combustion engine. Generally, the prime mover 26 generates power in response to combustion of fuel. In one aspect of the present disclosure, the first power source 22 also includes a transmission assembly 28. When the second power source 24 is connected in parallel to the first power source 22, the transmission assembly 28 directs the power from the prime mover 26 to at least one of wheels 16, 18 through a driveline 30.

Figure 2:
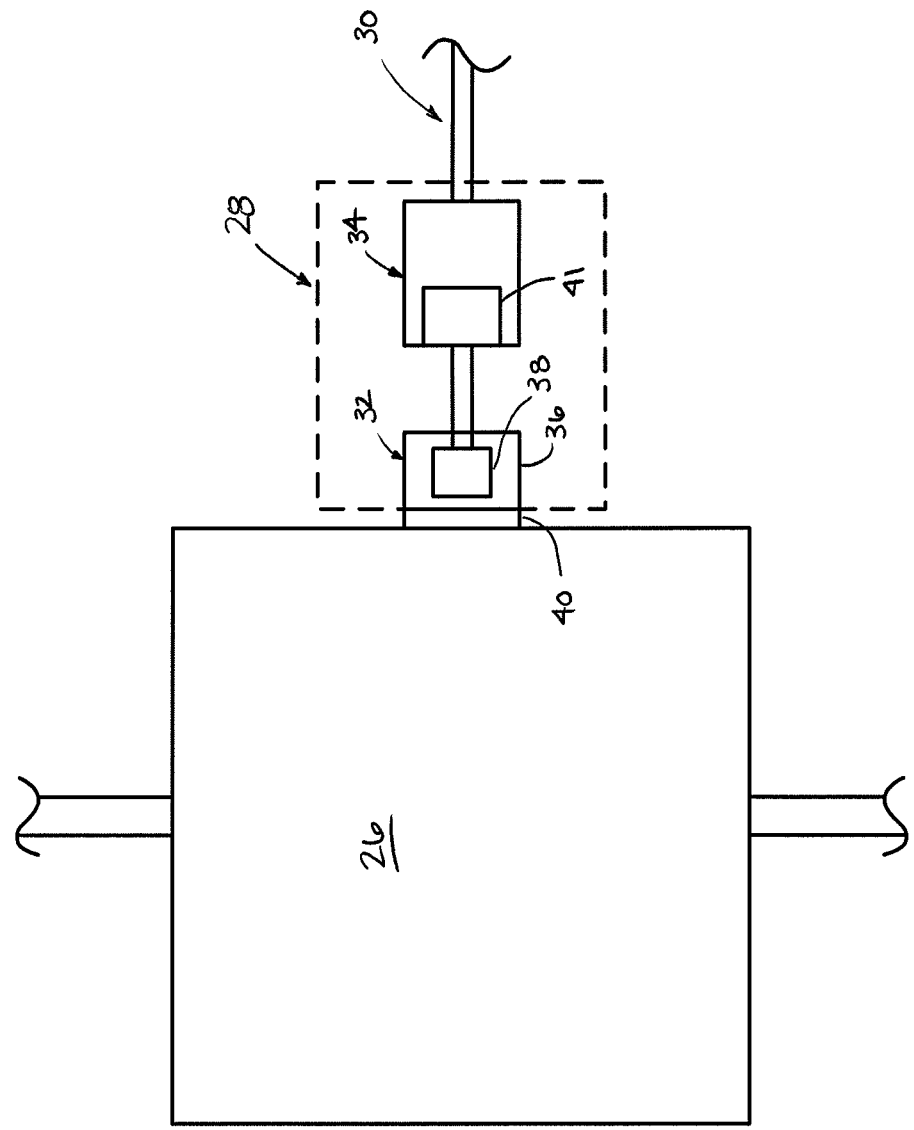
FIG. 2 is a schematic representation of a transmission assembly of the drive system of FIG. 1.

Referring now to FIG. 2, a schematic representation of the transmission assembly 28 is shown. The transmission assembly 28 is coupled to the prime mover 26.

The transmission assembly 28 includes a torque converter 32 and a transmission 34. The torque converter 32 is a conventional torque converter and includes a housing 36 and a turbine 38. In the depicted embodiment, the housing 36 of the torque converter 32 is coupled to a flywheel 40 of the prime mover 26. The turbine 38 of the torque converter 32 is coupled to the transmission 34.

The transmission 34 of the transmission assembly 28 couples the torque converter 32 to the drive line 30. In the depicted embodiment, the transmission 34 includes a clutch 41. The clutch 41 is adapted to engage and disengaged the transmission 34 from the prime mover 26.

Referring now to FIGS. 1 and 2, the driveline 30 of the depicted embodiment includes a front drive shaft 42, a rear drive shaft 44, left and right axle shafts 46, 48 and a differential 50. The differential 50 is disposed between the left and right axle shafts 46, 48. In the example shown, the left and right axle shafts 46, 48 connect the rear wheels 18 to the differential 50. In other embodiments, the driveline 30 can include axle shafts that connect the front wheels 16 to a differential.

Figure 3:
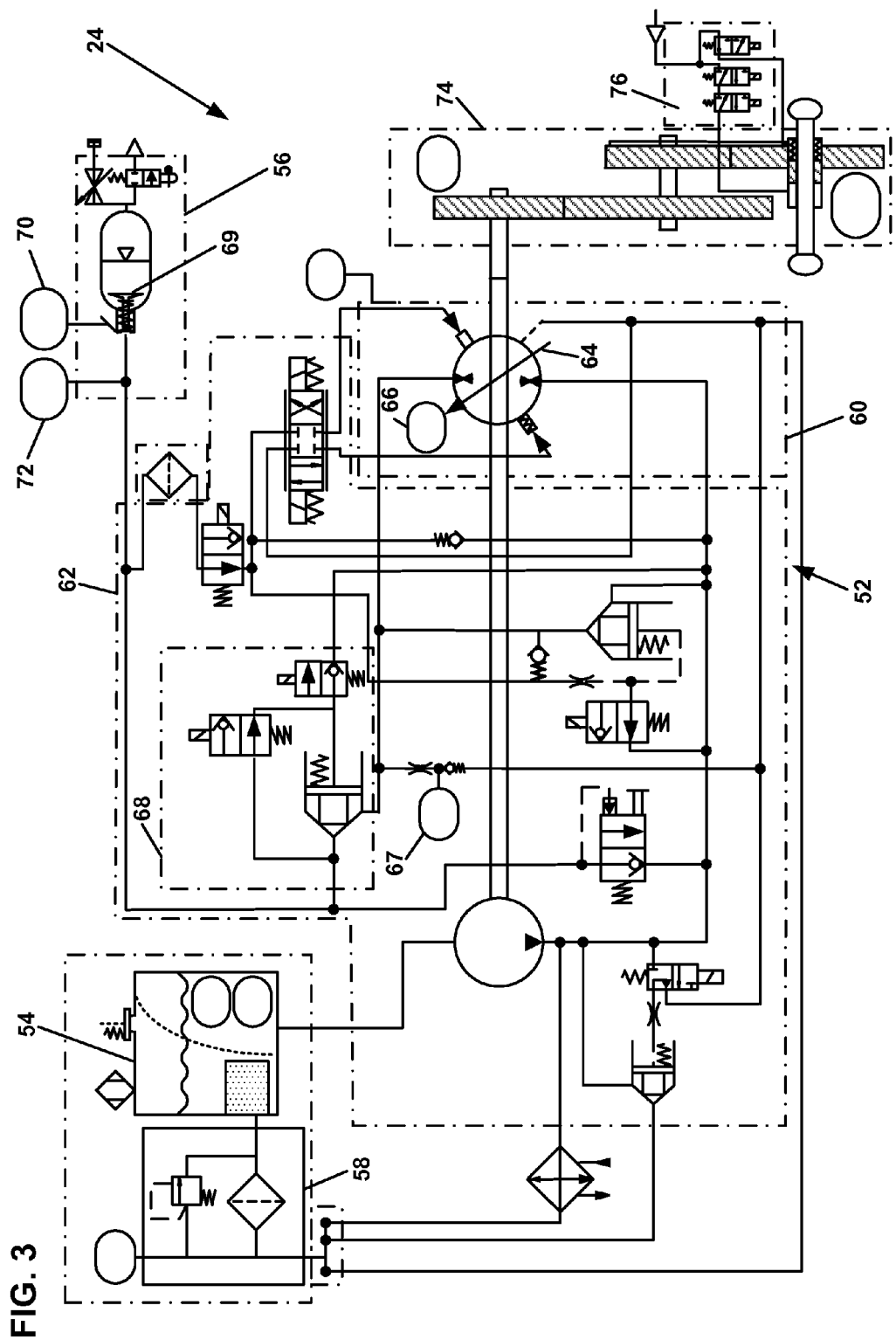
FIG. 3 is a schematic representation of a second power source that is suitable for use with the drive system of FIG. 1.
Figure 4:
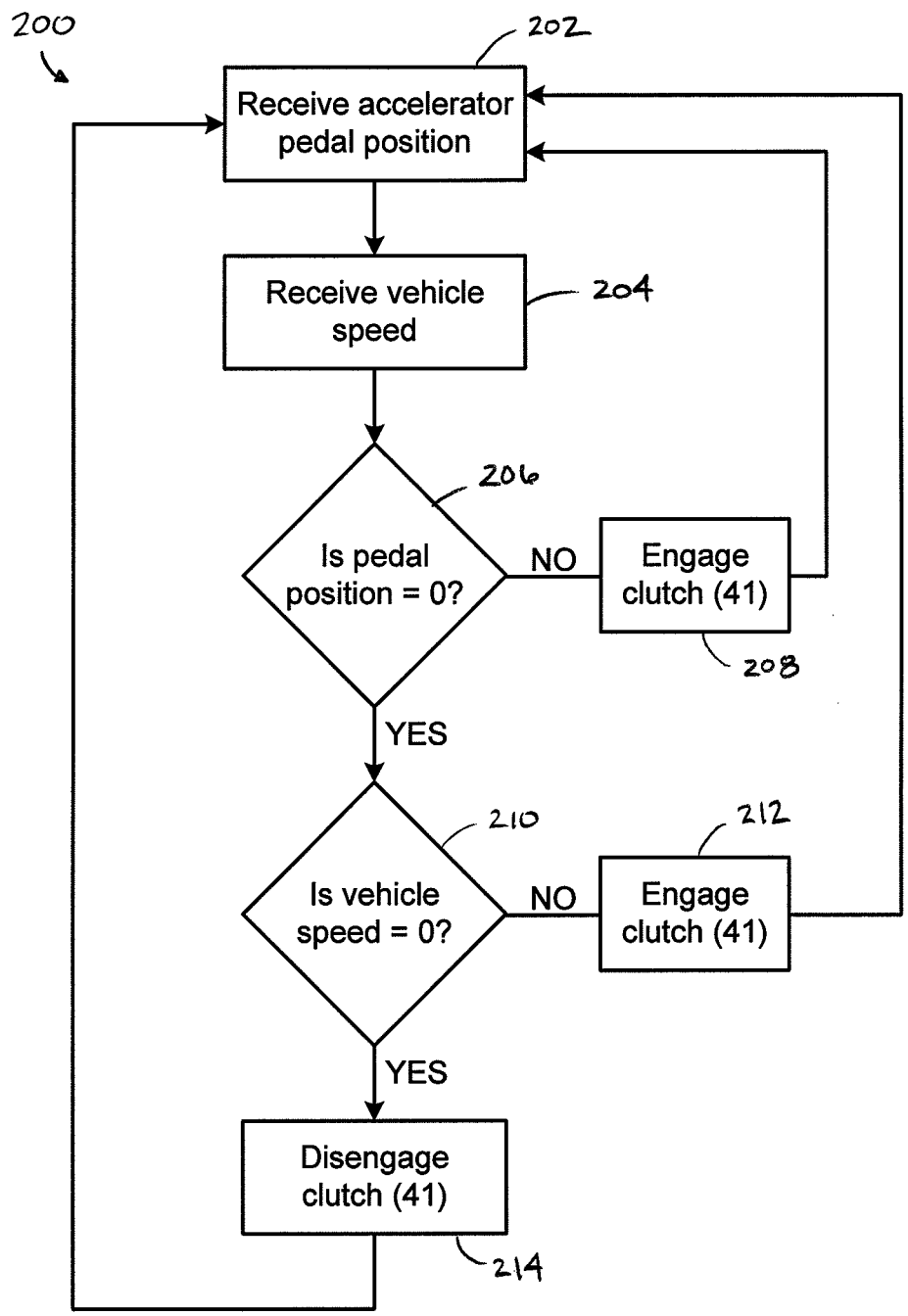
FIG. 4 is a flow diagram of a method for controlling a transmission assembly of a vehicle.

Referring now to FIGS. 1 and 3, the second power source 24 is a hydraulic power source. In the depicted embodiment, the second power source 24 includes a pump-motor assembly 52, a fluid reservoir 54, and an energy storage unit 56. The second power source 24 also includes a system filter 58. The pump-motor assembly 52 includes a pump/motor unit 60 and an end cover assembly 62. The pump-motor assembly 52 is arranged in selective fluid communication with a fluid reservoir 54 and an energy storage unit 56.

The pump/motor unit 60 is of a variable displacement type. In the depicted embodiment, the pump/motor unit 60 is of the axial piston type (e.g., a variable displacement axial piston type). In the depicted embodiment, the pump/motor unit 60 includes a variable swashplate 64. The swashplate 64 is adapted to move between full stroke for pumping and full stroke for motoring. In the depicted embodiment, the pump/motor unit 60 is biased to a neutral position. In the neutral position, the swashplate 64 is disposed between the full stroke position for pumping and the full stroke position for motoring.

The pump/motor unit 60 further includes a swashplate position sensor 66. The swashplate position sensor 66 is adapted to provide a signal corresponding to the angular position of the swashplate 64 to the control system 14. In the depicted embodiment, the pump/motor unit 60 includes two swashplate position sensors 66.

A neutral pressure sensor 67 is in fluid communication with a fluid port of the pump/motor unit 60. The neutral pressure sensor 67 monitors the pressure of fluid from the pump/motor unit 60 to the energy storage unit 56 when the pump/motor unit 60 is in pumping mode and the pressure of fluid from the energy storage unit 56 to the pump/motor unit 60 when the pump/motor unit 60 is in motoring mode.

A mode valve assembly 68 is disposed between the pump/motor unit 60 and the energy storage unit 56. In one embodiment, the mode valve assembly 68 is disposed in the end cover assembly 62.

In the depicted embodiment, the mode valve assembly 68 includes a plurality of valves that can be actuated to allow fluid to flow from the pump/motor unit 60 to the energy storage unit 56 in pumping mode and to allow fluid to flow from the energy storage unit 56 to the pump/motor unit 60 in motoring mode. In addition, the mode valve assembly 68 can be actuated to allow fluid to flow from either the pump/motor unit 60 or the energy storage unit 56 to the fluid reservoir 54.

In the depicted embodiment, the energy storage unit 56 is an accumulator (e.g., a gas-charged accumulator, etc.). The energy storage unit 56 includes a foot valve 69 that is movable between an open position and a closed position. In one embodiment, the movement of the foot valve 69 is based on the pressure of the fluid in the energy storage unit 56. In another embodiment, the foot valve 69 is electronically actuated.

The energy storage unit 56 further includes a proximity sensor 70 and a high pressure sensor 72. The proximity sensor 70 monitors the position of the foot valve 69. The high pressure sensor 72 monitors the fluid pressure in the energy storage unit 56.

The second power source 24 further includes an engagement assembly 74. In the depicted embodiment, the engagement assembly 74 is disposed between the front and rear drive shafts 32, 34. The engagement assembly 74 is adapted to selectively engage the pump/motor unit 60 to the driveline 30. In one aspect of the present disclosure, the engagement assembly 74 includes a clutch configured to selectively engage the pump/motor unit 60 to the driveline 30. For example, the clutch can include a clutch valve 76. In another aspect of the present disclosure, the engagement assembly 74 includes a transfer case (see FIG. 3).

In one aspect of the present disclosure, the engagement assembly 74 is adapted to engage (e.g., via the clutch) the pump/motor unit 60 to the driveline 30 when the vehicle 11 decelerates. During deceleration, the pump/motor unit 60 is engaged with the driveline 30 and acts as a pump. The pump/motor unit 60 transfers (e.g., pumps) fluid from the fluid reservoir 54 to the energy storage unit 56. As the fluid is transferred to the energy storage unit 56, the pressure of the fluid in the energy storage unit 56 increases.

In another aspect of the present disclosure, the engagement assembly 74 is adapted to engage (e.g., via the clutch) the pump/motor unit 60 to the driveline 30 when the vehicle 11 accelerates. During acceleration, the pump/motor unit 60 is engaged with the driveline 30 and acts as a motor. The pump/motor unit 60 receives pressurized fluid from the energy storage unit 56, which results in the pump/motor unit 60 transmitting torque to the driveline 30. This torque generated from the pump/motor unit 60 and transmitted to the driveline 30 is used to propel the vehicle 11.

In other aspects, the second power source 24 is connected in series with the first power source 22 and the prime mover 26 is coupled to the pump/motor unit 60. The pump/motor unit 60 is in fluid communication with a motor assembly (not shown) that is coupled to the left and right axle shafts 36, 38.

The control system 14 includes a first power source control system 78 and a second power control system 80. The first power source control system 78 is adapted to control the first power source 22. The second power source control system 80 is adapted to control the second power source 24.

The first power source control system 78 includes a transmission control unit 82. The transmission control unit 82 is adapted to control the operational aspects of the transmission assembly 28. In the depicted embodiment, the transmission control unit 82 is adapted to control the engagement/disengagement of the clutch 41 (shown in FIG. 2) of the transmission assembly 28.

In the depicted embodiment, the transmission control unit 82 includes a microprocessor 84 and a non-volatile memory component 86 (e.g., EPROM, EEPROM, flash memory, etc.). The microprocessor 84 of the transmission control unit 82 is adapted to receive electronic data signal inputs from a plurality of transmission sensors. In one aspect of the present disclosure, the transmission sensors can include any one or more of an input speed sensor, an output speed sensor, a wheel speed sensor, a throttle position sensor, a transmission fluid temperature sensor, etc. In another aspect of the present disclosure, the transmission control unit 82 can be adapted to receive electronic data signal inputs from any one or more of a kick down switch, which is used to determine if the accelerator has been depressed past full throttle, a traction control system, a cruise control module, etc.

The second power source control system 80 is adapted to control the operational aspects of the second power source 24. In one aspect of the present disclosure, the second power source control system 80 includes a microprocessor and a non-volatile memory component (e.g., EPROM, EEPROM, flash memory, etc.). The microprocessor 90 is adapted to receive electronic data signal inputs from a plurality of sensors. In one aspect of the present disclosure, the plurality of sensors can include any one or more of an accumulator pressure sensor, a pump/motor speed sensor, a reservoir fluid temperature sensor, a reservoir fluid level sensor, a swashplate angle sensor, etc.

The microprocessor of the second power source control system 80 is adapted to calculate control parameters for the second power source 24 from control algorithms stored on the non-volatile memory component of the second power source control system 80. The control parameters are calculated using the electronic data signals received from the plurality of sensors 94.

In the depicted embodiment, the transmission control unit 82 and the second power source control system 80 communicate with the associated sensors and with each other via a communication network 96 (shown in FIG. 1 as a line). In one aspect of the present disclosure, the communication network 96 is a controller-area network (CAN or CAN-Bus). In another aspect of the present disclosure, the communication network 96 utilizes a J1939 protocol.

Referring now to FIGS. 1, 2, 4 and 5, a method 200 for controlling the transmission assembly 28 will be described. As previously provided, the transmission assembly 28 includes the torque converter 32 and the transmission 34 having a clutch 41 that is adapted to engage/disengaged the transmission 34 from the prime mover 26. In conventional transmission assemblies, the clutch of the transmission assembly is engaged when the vehicle is accelerating, decelerating and idling. With the clutch engaged while the vehicle is idling, an input of the torque converter spins faster than an output of the torque converter. This speed differential between the input and output of the torque converter results in loading the engine, which results in energy losses. These energy losses are referred to as windage losses.

The method 200 is adapted to minimize windage losses associated with the torque converter 32 of the transmission assembly 28 of the vehicle 11 by disengaging the clutch 41 of the transmission 34 at select times during operation of the vehicle 11. While the method 200 will described with reference to the vehicle 11, it will be understood that the method 200 could be used with vehicles having only one power source (e.g., the first power source 22).

In step 202, the transmission control unit 82 receives a position of an accelerator pedal of the vehicle 11. In one embodiment, the position of the accelerator pedal is set to zero when the pedal is not depressed (i.e., released) and a value greater than zero when the pedal is depressed.

In step 204, the transmission control unit 82 receives a speed of the vehicle 11 from the communication network 84. In one embodiment, the speed of the vehicle 11 can be obtained from a speed sensor that monitors the speed of the driveline 30.

In step 206, the pedal position is compared to a position threshold value. In the depicted embodiment, the position threshold value is equal to zero. If the pedal position is greater than zero (i.e., the pedal is being depressed), the clutch 41 of the transmission assembly 28 is engaged so that the torque converter 32 is coupled to the transmission 34 in step 208.

Figure 5:
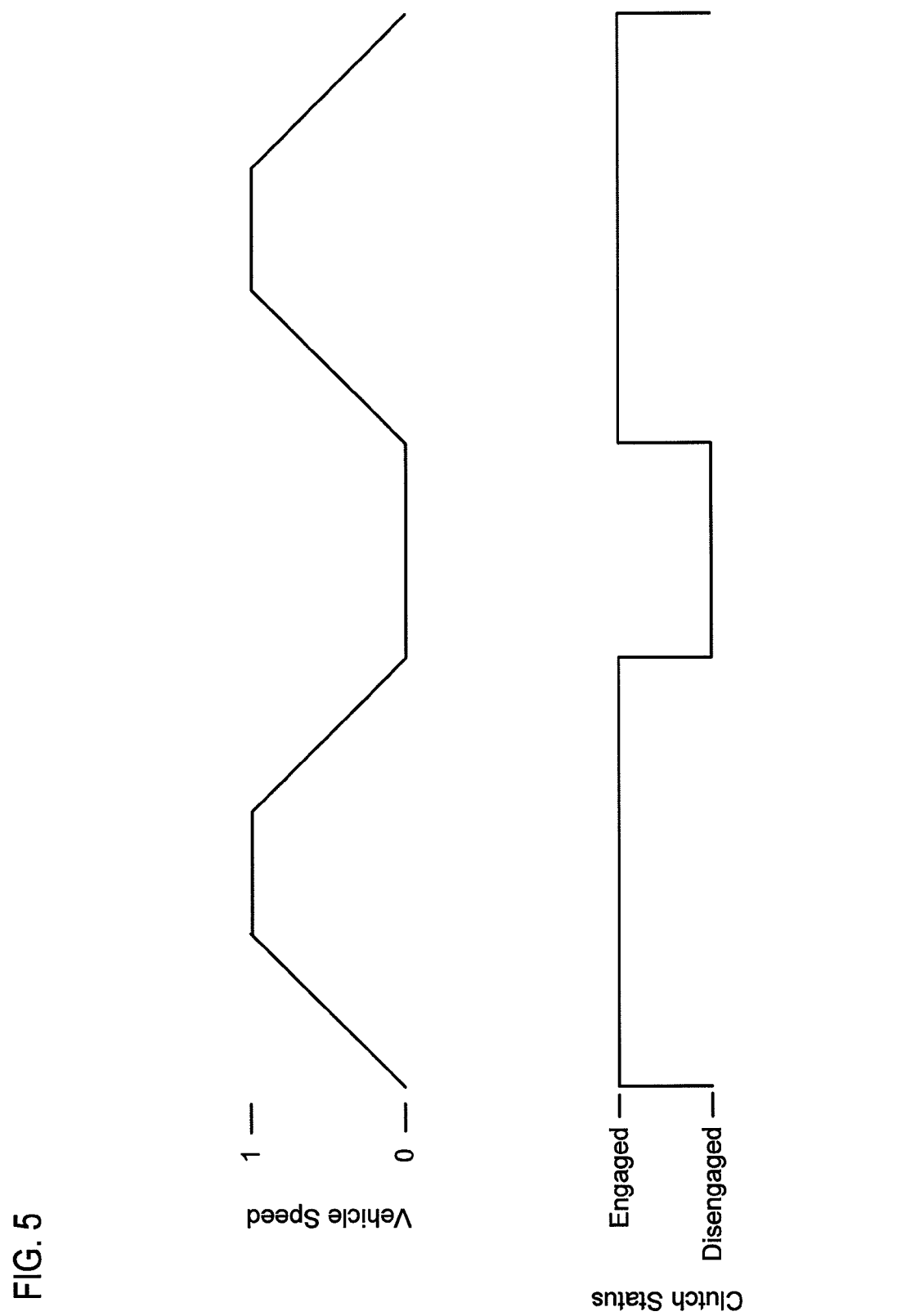
FIG. 5 is a graph showing clutch engagement for a transmission assembly and vehicle speed.

If the pedal position is equal to zero (i.e., the pedal is released), the vehicle speed is compared to a speed threshold value in step 210. In the depicted embodiment, the speed threshold value is equal to zero. If the vehicle speed is greater than zero, the clutch 41 of the transmission assembly 28 is engaged so that the torque converter 32 is coupled to the transmission 34 in step 212. If, however, the vehicle speed is equal to zero and the pedal position is equal to zero, the clutch 41 of the transmission assembly 28 is disengaged so that the torque converter 32 is not coupled to the transmission 34 in step 214. FIG. 5 graphs the engagement/disengagement of the clutch 41 in relation to vehicle speed.

By disengaging the clutch 41, there is not a speed differential between the input and output of the torque converter 32. As a result, the windage losses associated with the torque converter 32 are reduced. Disengaging the torque converter 32 from the transmission 34 while the prime mover 26 is at idle reduces fuel consumption by lowering the torque required to idle the prime mover 26.

Figure 6:
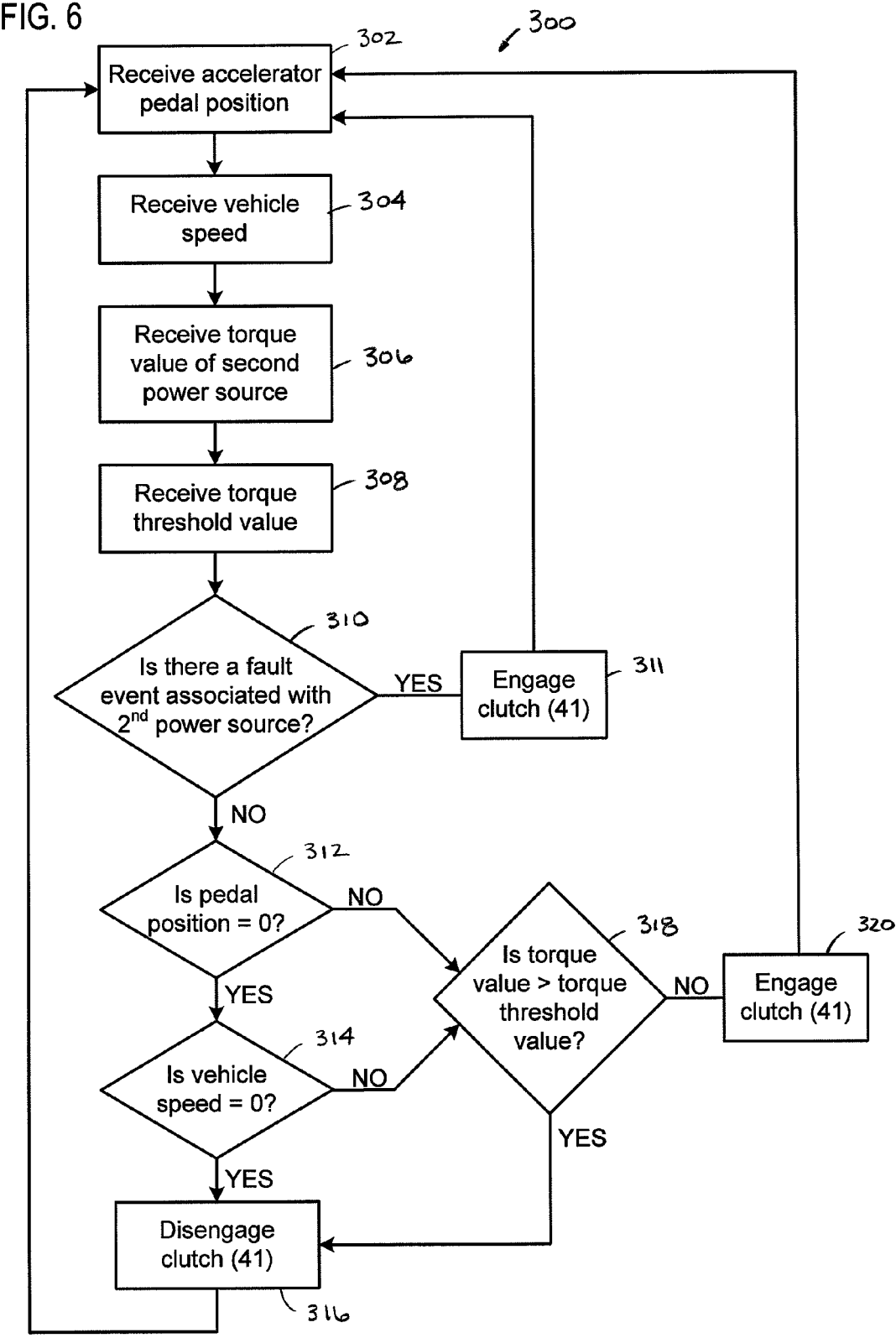
FIG. 6 is a flow diagram of an alternate method for controlling a transmission assembly of a vehicle.

Referring now to FIGS. 1, 2 and 6, an alternate method 300 for controlling the transmission assembly 28 of a vehicle 11 having first and second power sources 22, 24 will be described. In step 302, the transmission control unit 82 receives a position of an accelerator pedal of the vehicle 11. In one embodiment, the position of the accelerator pedal is set to zero when the pedal is not depressed (i.e., released) and a value greater than zero when the pedal is depressed.

In step 304, the transmission control unit 82 receives a speed of the vehicle 11 from the communication network 84. In one embodiment, the speed of the vehicle 11 can be obtained from a speed sensor that monitors the speed of the driveline 30.

In step 306, the transmission control unit 82 receives a torque value from the second power source control system 80 of the second power source 24. When the pump/motor unit 60 of the second power source 24 is in motoring mode (e.g., when the second power source 24 is accelerating or providing power to the vehicle 11), the torque value received from the second power source 24 is equal to the torque that is capable of being applied by the second power source 24 to the driveline 30. In one embodiment, the torque value is equal to the pressure of the fluid in the energy storage unit 56 times the displacement of the pump/motor unit divided by two pi.

When the pump/motor unit 60 of the second power source 24 is in pumping mode (e.g., when the vehicle 11 is decelerating), the torque value received from the power source 24 is equal to the torque required to rotate the pump/motor unit 60 in order to supply fluid to the energy storage unit 56. In one embodiment, the torque value required to rotate the pump/motor unit 60 is equal to the pressure of the fluid in the energy storage unit 56 times the displacement of the pump/motor unit divided by two pi.

In step 308, the transmission control unit 82 receives a torque threshold value. When the second power source 24 is in motoring mode, the torque threshold value is equal to the driver demanded torque value. The driver demanded torque value is made available to the transmission control unit 82 by an engine control unit through the communication network 84. When the second power source 24 is in pumping mode, the torque threshold value is equal to a predetermined threshold value that is chosen so that the transition between engagement/disengagement of the clutch 41 is smooth.

In step 310, the second power source 24 is evaluated to determine whether a fault event (e.g., error, malfunction, etc.) has occurred. A fault event can occur if there is any error, malfunction, etc. of any of the components of the second power source 24. If a fault event has occurred, the clutch 41 is engaged in step 311.

If a fault event has not occurred, the pedal position is compared to a position threshold value in step 312. In the depicted embodiment, the position threshold value is equal to zero.

If the pedal position is equal to zero, the vehicle speed is compared to a speed threshold value in step 314. In the depicted embodiment, the speed threshold value is equal to zero.

In step 316, the clutch 41 of the transmission assembly 28 is disengaged when there is no fault event, the pedal position is equal to zero and the vehicle speed is equal to zero. If, however, the pedal position is greater than the position threshold value or the vehicle speed is greater than the speed threshold value, the torque value of the second power source 24 is compared to the torque threshold value in step 318. If the torque value is greater than the torque threshold value, the clutch 41 is disengaged. If the torque value is less than the torque threshold value, the clutch 41 is engaged in step 320.

Figure 7:
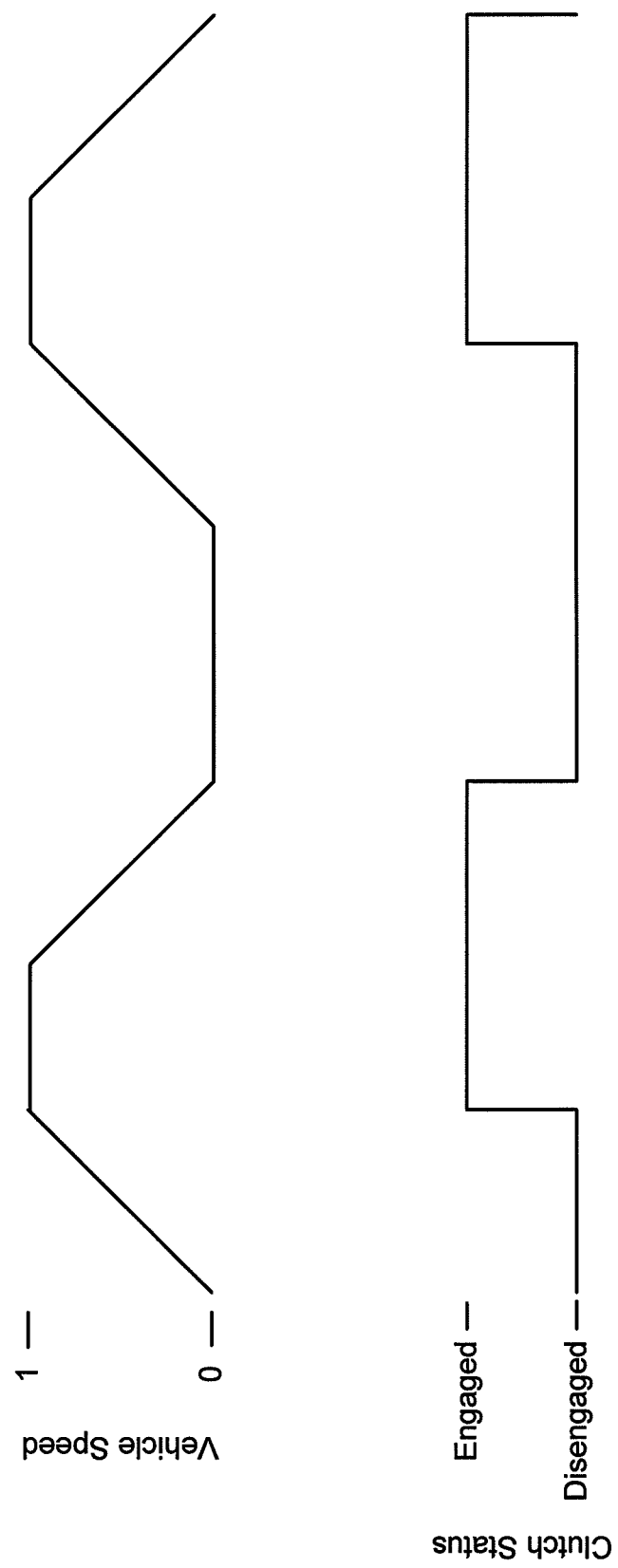
FIG. 7 is a graph showing clutch engagement for a transmission assembly and vehicle speed.

Referring now to FIG. 7, a graph is provided that shows the method 300 being applied during idling of the prime mover 26 and during acceleration. In this graph, the clutch 41 of the transmission assembly 28 is disengaged during at least a portion of the acceleration of the vehicle 11 as the second power source 24 would be providing power to the driveline 30 during this time. The clutch 41 is also disengaged while the prime mover 26 is idling.

Figure 8:
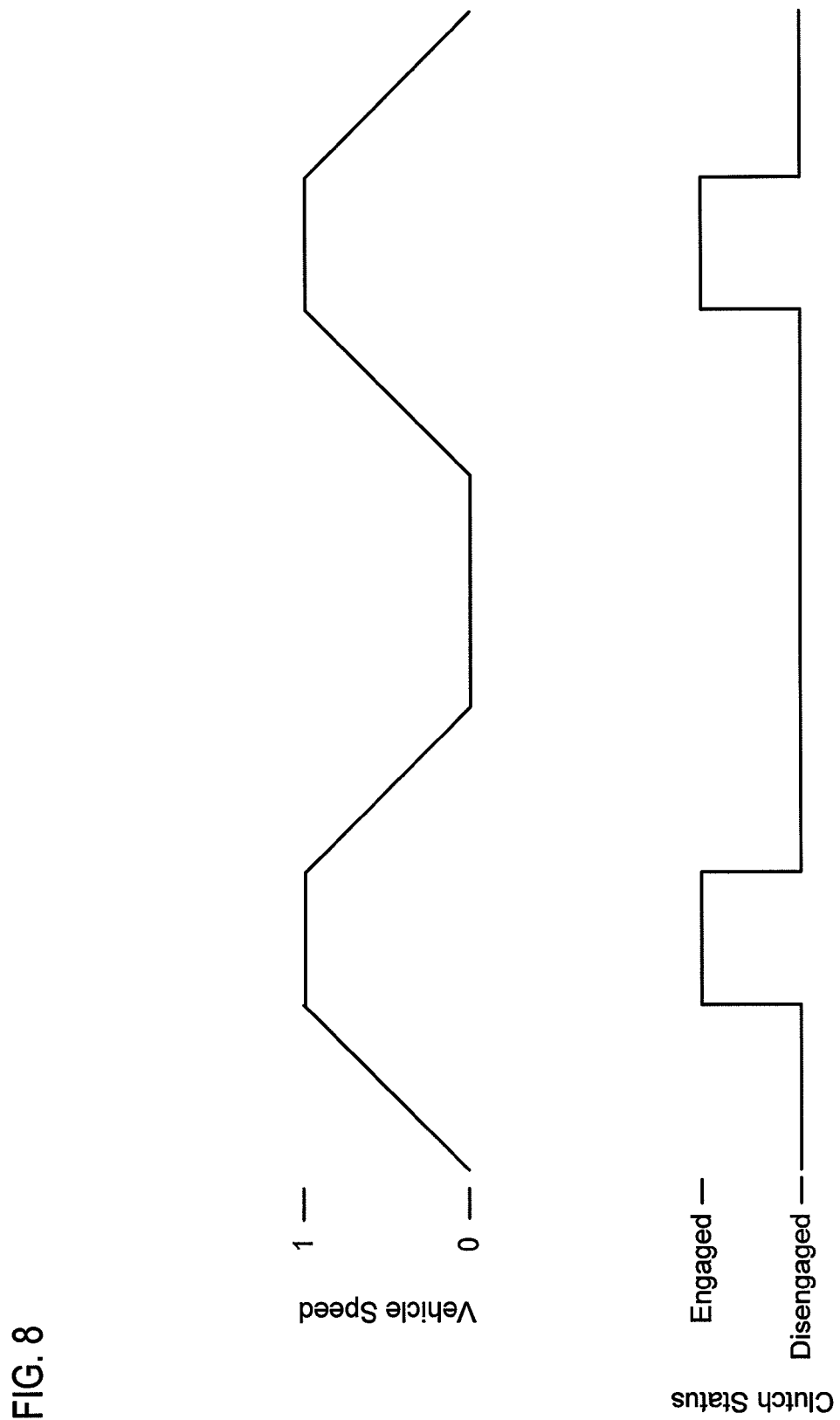
FIG. 8 is a graph showing clutch engagement for a transmission assembly and vehicle speed.

Referring now to FIG. 8, a graph is provided that shows the method 300 being applied during idling of the prime mover 26, during acceleration of the vehicle and during deceleration of the vehicle.

Figure 9:
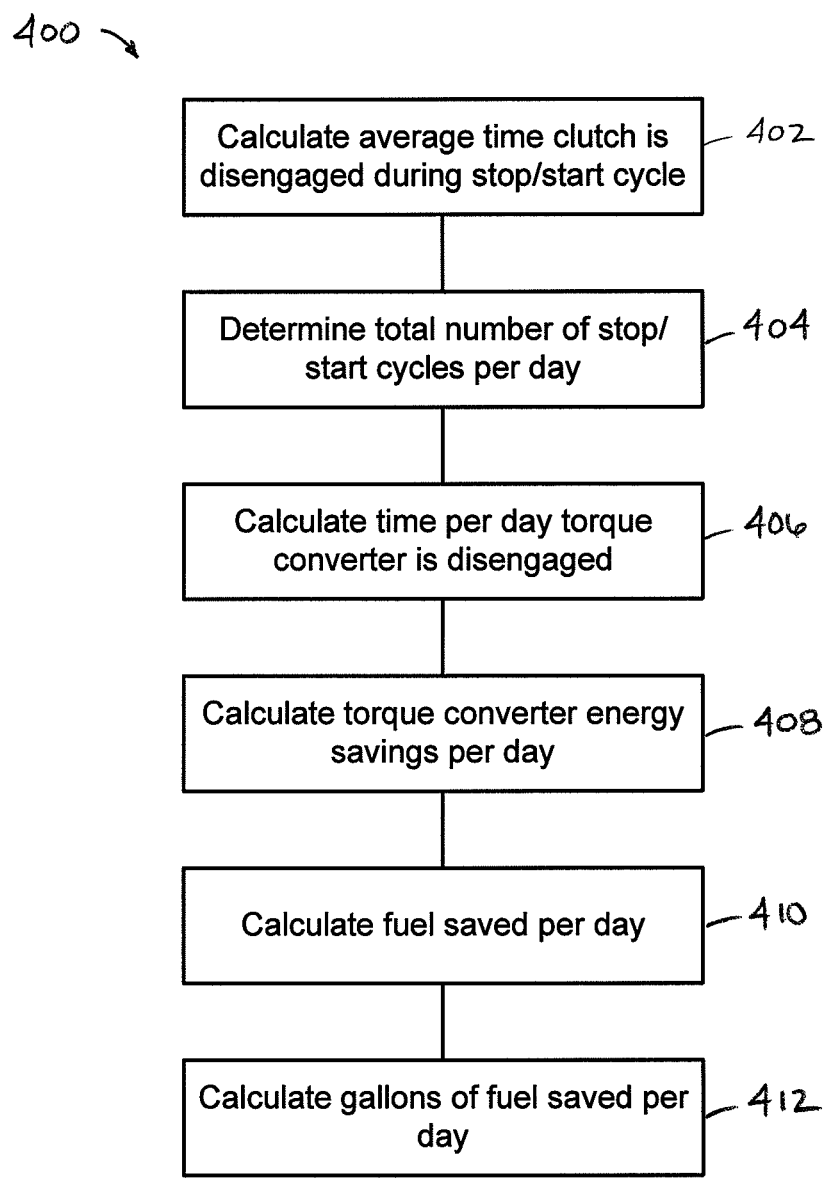
FIG. 9 is a flow diagram of a method for calculating fuel savings.

Referring now to FIG. 9, a method 400 for estimating fuel savings as a result of disengaging the torque converter 32 from the transmission 34 will be described. In step 402, the average time during which the clutch 41 is disengaged during a stop/start cycle of the vehicle is calculated. In step 404, the total number of stop/start cycles of vehicle per day is determined. In step 406, the time per day at which the torque converter 32 is disengaged from the transmission is calculated. In the depicted embodiment, the time per day at which the torque converter 32 is disengaged from the transmission is calculated by multiplying the average time during which the clutch 41 is disengaged during a stop/start cycle times the number of stop/start cycles per day. In one embodiment, a conversion factor may need to be applied.

The torque converter energy savings per day is calculated in step 408 by multiplying the time per day at idle times the power needed to idle the torque converter. In step 410, the fuel energy saved per day is calculated by dividing the torque converter energy savings per day by a fuel conversion efficiency. In step 412, the gallons of fuel saved per day is calculated by dividing the fuel energy saved per day by the energy content of the fuel.

In one embodiment, the method 400 is performed at a site that is remote from the vehicle 11. In this embodiment, the remote site receives the information from the vehicle 11 to make the above calculations. The output can then be provided to a customer on a predetermined basis (e.g., daily, weekly, monthly, yearly, etc.).

In another embodiment, the control system 14 performs the method 400. The fuel savings can be provided to the operator of the vehicle 11 through a vehicle interface system (e.g., LCD display, etc.).

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A method for controlling a transmission assembly of a vehicle, the method comprising:
providing a vehicle having a first power source and a second power source in parallel with the first power source, the first power source including a prime mover and a transmission assembly, the transmission assembly including a torque converter that is coupled to the prime mover, the transmission assembly further including a clutch that selectively engages the torque converter to a transmission of the transmission assembly, the second power source including a pump-motor unit, a fluid reservoir, and an energy storage unit;
comparing a torque value of the second power source to a torque threshold value;
disengaging the clutch of the transmission assembly so that the torque converter of the transmission assembly is disengaged from the transmission of the transmission assembly when the torque value of the second power source is greater than or equal to the torque threshold value.

2. The method of claim 1, wherein the torque threshold value is equal to a driver demanded torque.

3. The method of claim 2, wherein the driver demanded torque is provided by an engine control unit through a communication network.

4. The method of claim 2, wherein the torque value of the second power source is equal to a torque that is capable of being applied by the pump/motor unit of the second power source when the pump/motor unit is in a motoring mode.

5. The method of claim 1, wherein the torque value of the second power source is equal to a torque required to rotate the pump/motor unit in order to supply fluid to the energy storage unit.

6. The method of claim 1, further comprising comparing an accelerator pedal position to a position threshold value.

7. The method of claim 6, further comprising comparing a vehicle speed to a speed threshold value.

8. The method of claim 7, further comprising disengaging the clutch of the transmission assembly so that the torque converter of the transmission assembly is disengaged from the transmission of the transmission assembly when the accelerator pedal position is less than or equal to the position threshold value and the vehicle speed is less than or equal to the speed threshold value.

9. The method of claim 1, further comprising engaging the clutch if a fault event is identified in the second power source.

* * * * *